(12) United States Patent
Brittain

(10) Patent No.: US 9,264,548 B2
(45) Date of Patent: Feb. 16, 2016

(54) ESTABLISHING COMMUNICATION SESSIONS

(71) Applicant: Metaswitch Networks Ltd, Enfield, Middlesex (GB)

(72) Inventor: Paul John Brittain, Middlesex (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 13/962,457

(22) Filed: Aug. 8, 2013

(65) Prior Publication Data

US 2014/0044249 A1 Feb. 13, 2014

(30) Foreign Application Priority Data

Aug. 8, 2012 (GB) .................................. 1214195.8

(51) Int. Cl.
*H04M 1/56* (2006.01)
*H04M 15/06* (2006.01)
*H04M 3/56* (2006.01)
(Continued)

(52) U.S. Cl.
CPC ............ *H04M 3/563* (2013.01); *H04L 29/0638* (2013.01); *H04L 65/1069* (2013.01); *H04L 65/1096* (2013.01); *H04M 3/428* (2013.01);
(Continued)

(58) Field of Classification Search
CPC ......... H04M 3/54; H04M 3/543; H04M 1/57; H04M 3/436; H04M 3/58; H04Q 3/625; H04Q 3/66; H04Q 3/0016; H04Q 3/0012; H04Q 3/0004; H04Q 3/00; H04Q 3/303

USPC ............. 379/142.07, 211.01, 211.02, 212.01, 379/220.01, 221.01, 272, 273
See application file for complete search history.

(56) References Cited

U.S. PATENT DOCUMENTS 7,313,228 B1 * 12/2007 Sorice et al. ............... 379/88.17
7,587,032 B1 9/2009 de Waal
(Continued)

FOREIGN PATENT DOCUMENTS

EP 2 262 322 A1 12/2010
GB 2 449 762 A 12/2008
(Continued)

OTHER PUBLICATIONS

"Answer Hold", 3rd Generation Partnership Project 2 "3GPP2", 3GPP2 S.R0008, Version 1.0.0, Dec. 13, 1999.
(Continued)

*Primary Examiner* — Oleg Asanbayev
(74) *Attorney, Agent, or Firm* — EIP US LLP

(57) ABSTRACT

A method and apparatus for establishing a communication session with a user in a telecommunications network. The session is to be established between a remote device and one of a plurality of communication clients. Each of the clients is on a user device at which the user may participate in the session. A communication session control system located in a signalling path for the session transmits a session establishment request to a given client to place that client in a prior-to-answer session state. In response, the system receives a request from that client that the option to establish the session with the remote device be made available to at least one client of the plurality of clients other than the given client. The system transmits notification data to the at least one other client to notify that the session is available for retrieval by the at least one other client.

20 Claims, 8 Drawing Sheets

(51) Int. Cl.
  *H04L 29/06* (2006.01)
  *H04M 3/42* (2006.01)
  *H04M 3/428* (2006.01)
(52) U.S. Cl.
  CPC ...... *H04M 3/42229* (2013.01); *H04M 3/42263* (2013.01)

(56) References Cited

U.S. PATENT DOCUMENTS

| | | |
|---|---|---|
| 2004/0203935 A1 | 10/2004 | Dowling et al. |
| 2005/0122963 A1 | 6/2005 | Jeon et al. |
| 2007/0189482 A1* | 8/2007 | Erb .............................. 379/158 |
| 2009/0168978 A1 | 7/2009 | Laws et al. |
| 2009/0214017 A1* | 8/2009 | Koch ....................... 379/207.16 |
| 2010/0150332 A1 | 6/2010 | Soo et al. |
| 2013/0102298 A1* | 4/2013 | Goodman et al. ............ 455/417 |

FOREIGN PATENT DOCUMENTS

| | | |
|---|---|---|
| GB | 2479180 A | 10/2011 |
| WO | 02 03734 A1 | 1/2002 |
| WO | 2006/055221 A2 | 5/2006 |
| WO | 2006058036 A2 | 6/2006 |
| WO | 2007/007042 A2 | 6/2007 |
| WO | 2007118250 A2 | 10/2007 |

OTHER PUBLICATIONS

GB Search Report for GB Application No. GB1214195.8 dated Jan. 14, 2013.
http://www.hudlite.org/screenshots.htm Copyright 2004-2007 Fonality.

* cited by examiner

| Treatment | Type | Valid For | Default |
|---|---|---|---|
| System default | Audio | All | All |
| Exiting meeting | Audio | Work, Family | Work |
| Moving to video | Video | Work, Family | Family |
| Bad reception | Audio | All | |

ESTABLISHING COMMUNICATION SESSIONS

CROSS-REFERENCE TO RELATED APPLICATIONS

This application claims priority to foreign patent application no. GB 1214195.8 filed Aug. 8, 2012, the disclosure of which is incorporated herein by reference in its entirety.

TECHNICAL FIELD

The present disclosure relates to establishing communication sessions.

BACKGROUND

Telephony users have long had to deal with a proliferation of user devices (sometimes referred to as 'user equipment' or 'endpoints') through which third parties may contact them. For example, a user might have a fixed-line (or 'wireline') telephony user device for use at home, a further fixed-line telephony user device for use in the office, and a mobile telephony user device for use whilst on the move. Each type of telephony device has associated advantages; whilst a mobile telephony device provides the user with mobility, a fixed-line telephony device can provide more reliable communications with no battery recharge concerns.

Users may also have a number of different access technologies available through which their telephony user devices may conduct communications. For example, a telephony user device may be equipped with a circuit-switched communication interface and one or more circuit-switched communication clients for conducting communications via suitable circuit-switched networks. Likewise, a telephony user device may also/alternatively be equipped with a packet-switched communication interface and one or more packet-switched communication clients for communicating via suitable packet-switched networks.

A circuit-switched telephony device may comprise a fixed-line Plain Old Telephone Service (POTS) telephone equipped with a circuit-switched interface and communication client for conducting communications via a Public Switched Telephone Network (PSTN). A circuit-switched telephony user device may comprise a mobile (or 'cellular') telephone equipped with a wireless circuit-switched interface and communication client for conducting communications via a cellular network such as a Global System for Mobile Communications (GSM) network or Code Division Multiple Access (CDMA) network.

More recently, packet-switched telephony devices have proliferated which may take the form of a fixed-line Internet Protocol (IP) telephone equipped with a fixed-line packet-switched interface and communication client for communicating via an Internet Protocol (IP) network, such as the internet or an IP Private Branch Exchange (IP-PBX). Similarly, a user may conduct communications via a personal computer (PC) equipped with a packet-switched communication client for conducting communications over the internet via a fixed-line internet connection. A mobile packet-switched telephony device may take the form of a portable computing device, such as a laptop or tablet, equipped with a wireless packet-switched interface and communication client for communicating via an IP network, such as the internet, using a WiFi™ or Bluetooth™ compliant wireless access point. A packet-switched communication client may conduct communications according to an internet telephony protocol, commonly referred to as Voice over Internet Protocol (VoIP), with associated setup and/or control protocols such as the Session Initiation Protocol (SIP) or H.323.

Increasingly, telephony user devices are available that are equipped with multiple communication interfaces to facilitate communication via multiple access technologies. For example, a modern "smartphone" is typically equipped with a circuit-switched interface for communicating via a cellular network and a packet-switched interface for communicating via the internet. Commonly, a smartphone may be equipped with several packet-switched interfaces, for example, a short-range radio interface, e.g. WiFi or Bluetooth™ compliant, and/or or via an interface for communication of packet data through a cellular network, such as 3rd Generation Partnership Project (3GPP) Long Term Evolution (LTE), LTE-Advanced (LTE-A), High Speed Packet Access (HSPA), Wideband Code Division Multiple Access (W-CDMA) or Mobile WiMax etc. In such cases, a packet-switched communication client may also be deployed for conducting communications via one or more of the available wireless packet-switched interfaces. In cases such as this where a device is equipped with more than one communication client, the various clients deployed in that device are referred to as co-located. A suitable packet-switched communication client may be deployed on a user equipment prior to sale, or could be deployed subsequently through an application distribution portal such as the Apple® App Store$^{SM}$ or Android™ Market etc.

To avoid confusing originating parties with identifiers such as telephone dialling numbers for each of the various communication clients of a user, a one-telephone dialling number telephony service allows the user to publish a single telephone dialling number on which they can be contacted. Using a simultaneous ringing service, when the single telephone dialling number is terminating, more than one of the user's communication clients will ring simultaneously. The user is then able to establish the communication session using the communication client of his choosing.

Although one-telephone dialling number telephony services have provide the benefits associated with being able to publish a single telephone dialling number, they have typically left the user interface and function only minimally updated from a basic voice service.

It would be desirable to provide additional telephony service features to improve usability and user-experience in particular, but not exclusively, where the user has a plurality of communication clients or devices.

SUMMARY

In accordance with first embodiments, there is provided a method for establishing a communication session with a user in a telecommunications network, the communication session to be established between a remote device associated with a remote party and one of a plurality of communication clients, each said communication client being on a user device at which the user may participate in the communication session, the method comprising, at a communication session control system located in a signalling path for the communication session:

transmitting a communication session establishment request to a given communication client to place the given communication client in a prior-to-answer session state;

receiving, in response to transmitting the communication session establishment request, a request from the given communication client that the option to establish the communication session with the remote device be made available to at least one communication client of the plurality of communication clients other than the given communication client; and transmitting notification data to the at least one other communication client in the plurality of communication clients to notify the at least one other communication client that the communication session is available for retrieval by the at least one other communication client.

In accordance with second embodiments, there is provided an apparatus for establishing a communication session with a user in a telecommunications network, the communication session to be established between a remote device associated with a remote party and one of a plurality of communication clients, each said communication client being on a user device at which the user may participate in the communication session, the apparatus being locatable in a signalling path for the communication session and comprising:

one or more transmitters operable to transmit a communication session establishment request to a given communication client to place the given communication client in a prior-to-answer session state;

one or more receivers operable to receive, in response to transmitting the communication session establishment request, a request from the given communication client that the option to establish the communication session be made available to at least one communication client of the plurality of communication clients other than the given communication client; and one or more transmitters operable to transmit notification data to the at least one other communication client in the plurality of communication clients to notify the at least one other communication client that the communication session is available for retrieval by the at least one other communication client.

In accordance with third embodiments, there is provided a user device for establishing a communication session with a user in a telecommunications network, the communication session to be established between a remote device associated with a remote party and one of a plurality of communication clients, each said communication client being on a user device at which the user may participate in the communication session, the user device comprising:

one or more receivers operable to receive a communication session establishment request;

one or more processors arranged to enter the user device into a prior-to-answer session state in response to receiving the communication session establishment request;

a user interface via which a user of the user device is informable of an option for the communication session to be established using at least one other of said communication clients;

the or another user interface via which user input relating to the establishment of the communication session is receivable; and one or more transmitters arranged to transmit, in response to receiving predetermined user input during the prior-to-answer session state, a request that the option to establish the communication session with the remote device be made available to at least one other communication client in the plurality of communication clients.

In accordance with fourth embodiments, there is provided a method for establishing a communication session with a user in a telecommunications network, the communication session to be established between a remote device associated with a remote party and one of a plurality of communication clients, each said communication client being on a user device at which the user may participate in the communication session, the method comprising, at a given one of said user devices:

receiving a communication session establishment request;

entering a prior-to-answer session state in response to receiving the communication session establishment request;

informing the user of the user device via a user interface of an option for the communication session to be established using at least one other of said communication clients;

receiving, via the or another user interface, predetermined user input; and transmitting, during the prior-to-answer session state, a request that the option to establish the communication session with the remote device be made available to at least one other communication client in the plurality of communication clients.

Further features and advantages will become apparent from the following description of preferred embodiments, given by way of example only, which is made with reference to the accompanying drawings.

DETAILED DESCRIPTION

Figure 1:
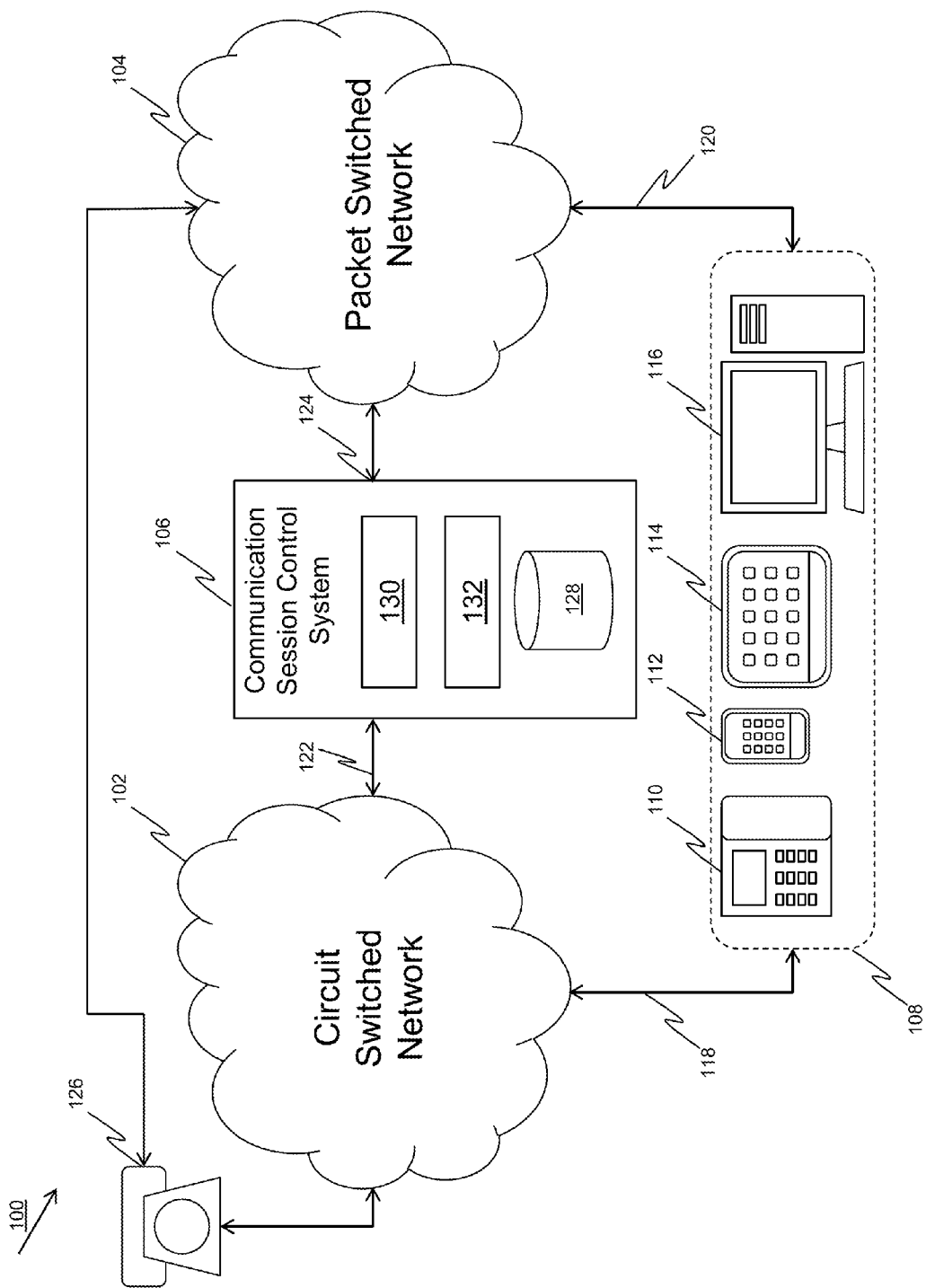
FIG. 1 is a schematic representation of a telecommunications network in accordance with some embodiments.

FIG. 1 shows an example telecommunications network 100 in which various embodiments may be employed to facilitate establishment of communication sessions.

Telecommunications network 100 includes a circuit-switched telecommunications network part 102, a packet-switched network part 104 and may include other network parts (not shown).

In some embodiments, a client-shared telephony service is hosted and controlled by a communication session control system 106. In addition to hosting and controlling the client-shared telephony service, the communication session control system 106 supports various communication session-handling features that are intended to improve usability and user-experience in particular, but not exclusively, where the user has a plurality of communication clients or devices. Although depicted in FIG. 1 as a single network entity located between circuit-switched network part 102 and packet-switched network part 104, communication session control system 106 may comprise a plurality of network entities, with elements located within circuit-switched network part 102 and/or packet-switched network part 104 or one or more other networks (not shown).

A user of the client-shared telephony service may have a number of communication devices 108 through which they may conduct communications via the service. The various communication devices 108 through which a user can conduct communications via the service are considered to be associated with that user. The user's associated communication devices 108 may include, for example, desk phone 110, mobile (or 'cellular') telephone 112, tablet 114 and/or personal computer 116.

The user's communication devices 108 are equipped with one or more interfaces and one or more communication clients for conducting communications in the telecommunications network 100. Communication devices equipped with a circuit-switched interface and communication client are adapted to conduct communications in telecommunications network 100 via link 118 with circuit-switched network 102. The circuit-switched interface may comprise a landline PSTN interface in the case of a fixed-line device such as desk phone 110, or a cellular radio telephony interface in the case of a mobile device such as mobile telephone 112. Communication devices equipped with a packet-switched interface and communications client are adapted to conduct communications in telecommunications network via link 120 with packet-switched network 104. This packet-switched interface could comprise a wired interface to the Internet in the case of a fixed line device such as personal computer 116, or a wireless interface (e.g. WiFi, Bluetooth, 3G-LTE, WiMax, etc.) to the Internet in the case of a mobile device such as tablet 114. The packet-switched interface may comprise an Ethernet port.

Some communication devices may be equipped with multiple communication clients. For example, in addition to the aforementioned circuit-switched communication client and associated interface, mobile telephone 112 may also be equipped with one or more packet-switched communications clients and interfaces for conducting communications with packet-switched network 104 via link 120. In this case, the multiple communication clients equipped on mobile telephone 112 are referred to as co-located communication clients, i.e. multiple communication clients on a single device. However, in some embodiments, the communication clients may be provided on different user devices. Several of the communication clients on one or more of the user's devices 108 may all be associated with one telephony ID (which is hereinafter referred to as twinning), for example a shared telephone dialling number, SIP Uniform Resource Identifier (URI) or another appropriate form of shared identifier.

Communication session control system 106 comprises a user database 128 for storing, amongst other things, data associated with users of the client-shared telephony service. In some embodiments, user database 128 includes a list of identifiers for the communication clients associated with the various communication devices 108 associated with a given user. User database 128 may also store a user profile associated with each user, which contains a number of user configurable preferences, such as communication session routing preferences and/or default communication session hold treatments as will be explained in more detail below.

Data, such as signalling and/or media data, relating to communication session involving a communication client on one of the user's devices 108 and a communication client on a device of a remote party 126 may be routed between circuit-switched network 102 and communication session control system 106 via link 122. Link 122 may for example comprise a SIP trunk, or other high capacity communications link. Similarly, data, such as signalling and/or media data, relating to such communication sessions may be routed between packet-switched network 104 and communication session control system 106 via link 124.

Link 122 and/or link 124 may comprise one or more gateway or session border controller entities (not shown) which carry out conversion between the various protocols and data formats used to transfer media data and signalling data in the different networks making up telecommunications network 100. For example, a media gateway (not shown) may convert between the different protocols of media data passing between circuit-switched network 102 and packet-switched network 104, such as packetized Voice over Internet Protocol (VoIP) data into Time-Division-Multiplexing (TDM) voice data and vice versa. A signalling gateway (not shown) may convert between the different protocols of signalling information passing between circuit-switched network 102 and packet-switched network 104, such as SIP, Signalling System 7 (SS7), Integrated Services Digital Network User Part (ISUP), American National Standards Institute (ANSI)-41, Mobile Application Part (MAP) formats, etc.

In order to provide the client-shared telephony service, circuit-switched network 102 is configured to route communication sessions between the user's devices 108 and a remote party device 126 via communication session control system 106. Communication session control system 106 may comprise a media gateway controller, service platform, communication session agent, application server or softswitch and may perform other functions typically associated with such entities.

The communications system 100 may also comprises one or more configuration clients (for example PC or web-based) which allow configuration of the service but which do not participate in the communication sessions themselves. The configuration clients may communicate with the communication session control system 106 using appropriate protocols, such as Web Services or Plain HTTP.

In some embodiments, communication session control system 106 comprises a communication session server element 130, referred to herein as a twinning communication session server element, which hosts the client-shared telephony service. The communication session server element 130 interacts with the communication clients via one or more protocols such as SIP, Web Services (for example JavaScript Object Notation (JSON)), or the like.

In some embodiments, the communication session control system 106 also comprises a media server element 132 capable of storing and playing audio, video and other media under instruction of the communication session server element 130. The media server element 132 interacts with the communication clients using one or more appropriate protocols, such as the Real-time Transport Protocol (RTP) or another suitable media transfer protocol.

The twinning communication session server element 130 and the media server element 132 may be provided in one or more physical server units or may be provided in multiple physical units, either co-located or located remotely from each other. The communication session server element 130 may communicate with the media server element via a suitable interface, for example SIP, File Transfer Protocol (FTP), H.248.

Figure 2:
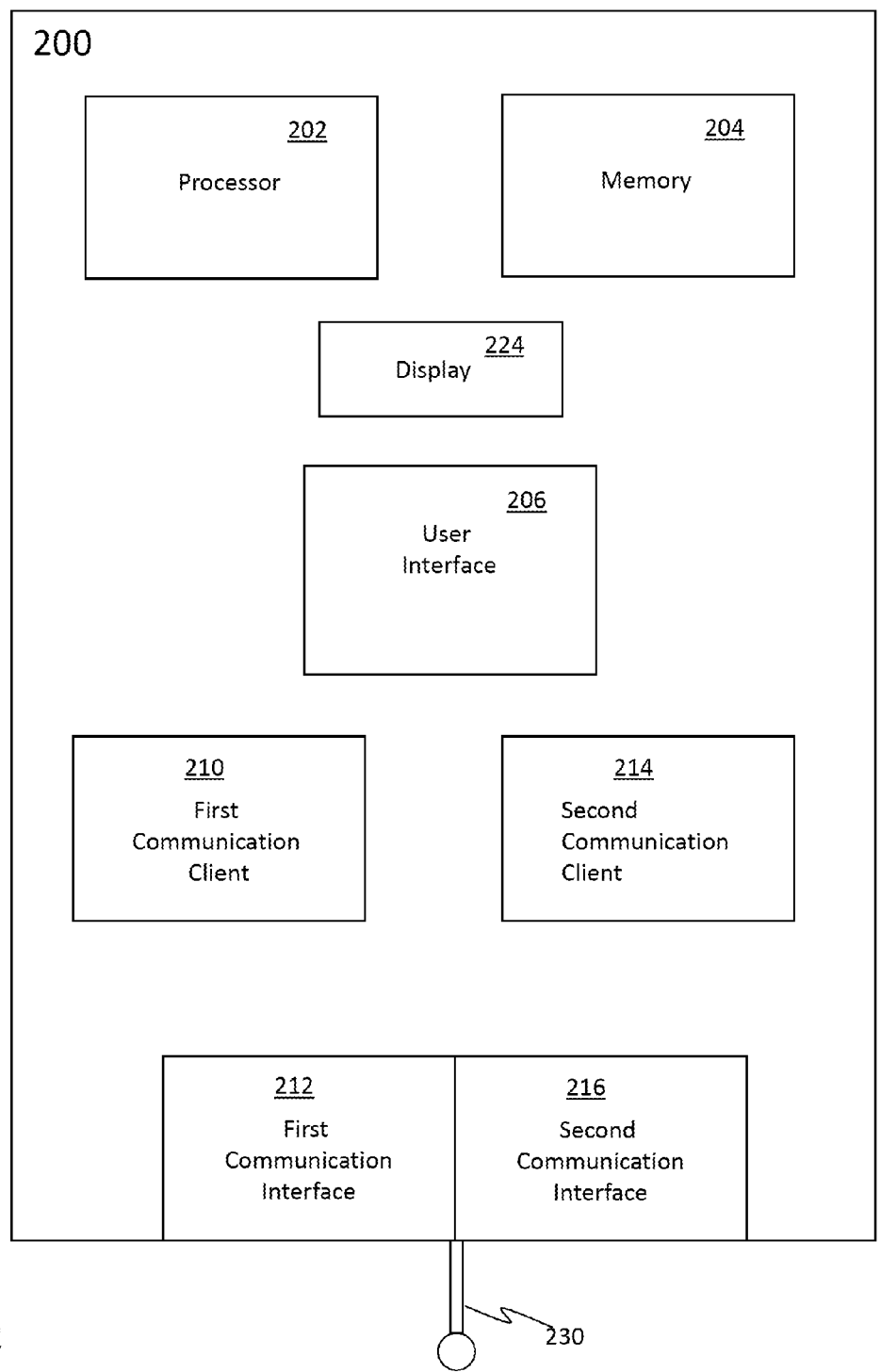
FIG. 2 is a schematic representation of a telephony device in accordance with some embodiments.

FIG. 2 shows a communication device 200 adapted to conduct communication sessions such as voice and/or video communication sessions in telecommunication network 100 according to some embodiments. Communication device 200 may for example be mobile telephone 112 depicted in FIG. 1.

Communication device 200 comprises a processor 202 for carrying out various data processing tasks. Communication device 200 comprises a memory 204 for storing data. Communication device 200 comprises a user interface 206 for collecting user input from a user of the device, including user input associated with setting up and acceptance of communication sessions, such as telephone dialling number digits or incoming communication session acceptance or rejection or other communication session-handling commands. In some embodiments, communication device 200 also comprises a display 224. In some embodiments, user interface 206 may comprise a touch-screen layer overlaying display 206, upon which one or more touch-sensitive screen regions (or 'buttons') are configurable by processor 202.

Communication device 200 comprises a first communication client 210 adapted to communicate via a first part of telecommunications network 100 via a first communication interface 212. In some embodiments, first communication client 210 comprises a circuit-switched communication client adapted to communicate via a circuit-switched part 102 of telecommunications network 100. In such embodiments, first communication interface 212 is a circuit-switched communication interface.

In some embodiments, communication device 200 also comprises a second communication client 214 adapted to communicate via a second, different part of telecommunications network 100 via a second communication interface 216. In such embodiments, first communication client 210 and second communication client 214 are described as being co-located on communication device 200. In some embodiments, second communication client 214 comprises a packet-switched communication client adapted to communicate via a packet-switched part 104 of telecommunications network 100. In some such embodiments, second communication interface 216 is a packet-switched communication interface.

In some embodiments, first communication interface 212 and second communication interface 216 comprise one or more antennas 230 for wireless radio communication, which may be shared between first communication interface 212 and second communication interface 216. In some such embodiments, first communication interface 212 and second communication interface 216 comprise a cellular radio modem and a non-cellular radio modem respectively.

In alternative embodiments, first communication interface 212 and second communication interface 216 comprise one or more hardware ports for fixed-line communication. In some such embodiments, first communication interface 212 comprises a PSTN port. In some such embodiments, second communication interface 216 comprises an Ethernet port.

Figure 3:
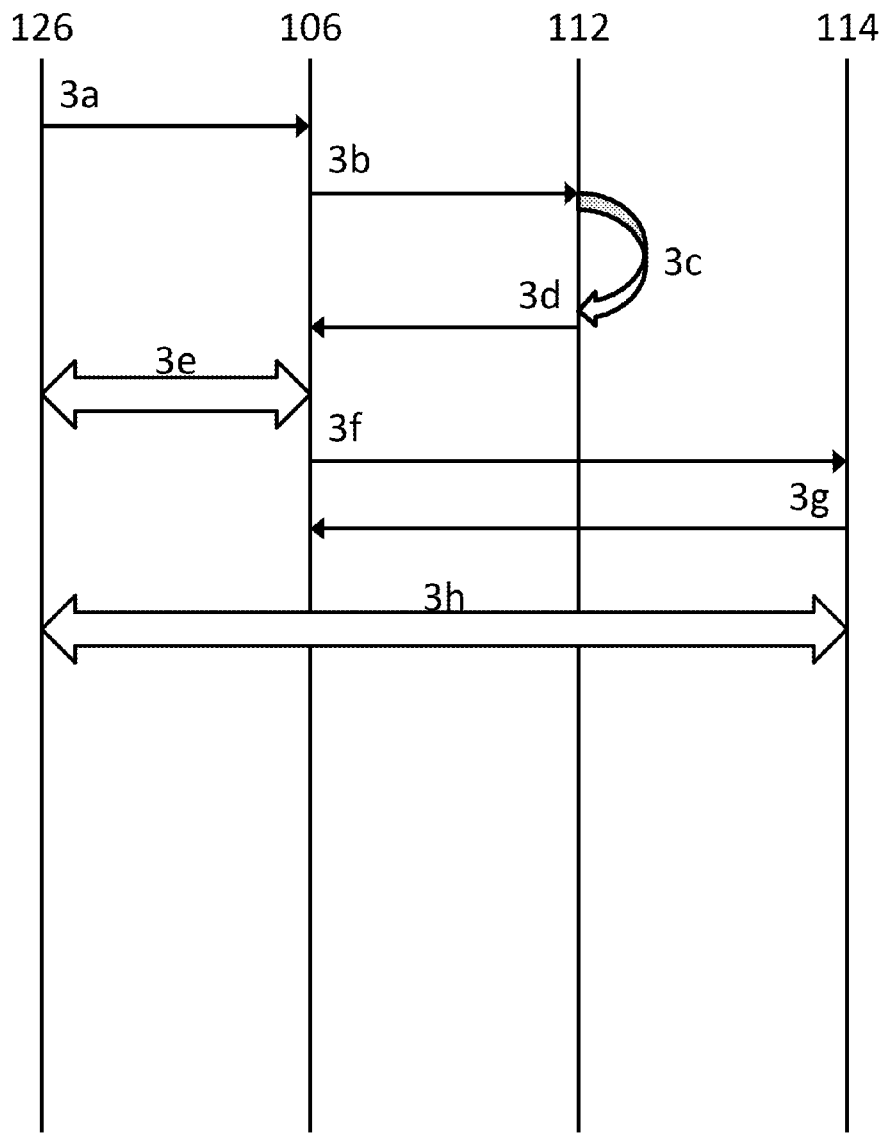
FIG. 3 is a message flow diagram showing a method for establishing a communication session in accordance with some embodiments.

FIG. 3 is a signalling message flow diagram showing a method for establishing communication sessions according to some embodiments.

The telecommunications network 100 described above may be used to provide a user of a multi-device, multi-media service with simplified handling of new and potentially awkward communication session establish and communication session hold scenarios that arise in such a service. In particular, the fact that the user may have more than one portable device, for example both a mobile handset 112 and a video-capable tablet 114, as well as one or more PCs, introduces many new options for how the end user may move between devices and locations during a voice or multimedia communication session or even before the communication session is established.

The communication session control system 106 provides various communication session-related features that are intended to improve usability and user-experience in relation to the client-shared telephony service. One of these communication session-related features which will be described in more detail below offers a function or feature that provides the ability to hold a communication session on one twinned device and to enable the held communication session to be retrieved on any other twinned device. This feature can be used prior to the communication session being established, for example when a communication client initially alerts the user to an incoming communication session. As such, rather than establishing the communication session immediately or rejecting the communication session outright, the user has a third option to establish the communication session directly to hold and then retrieve the communication session that is currently on hold from another of their communication devices.

In more detail, at step 3$a$, a communication session setup request to the client-shared dialling number is transmitted by a communication client on remote party device 126. The communication setup request of step 3$a$ may pass through a number of further entities or network parts (not shown) between remote party device 126 and circuit-switched network 102, such as one or more telephone switches. Circuit-switched network 102 has been configured to route communication session signalling data relating to the client-shared dialling number to communication session control system 106, and contacts communication session control system 106 with appropriate communication session signalling data. Upon receipt of the communication session signalling data, communication session control system 106 takes control of the communication session.

At step 3$b$, communication session control system 106 transmits one or more communication session setup requests to one or more of the user's communication clients, in this case a communication client provided on a first of the user's communication devices 112. The communication session establishment request is operable to place the one or more communication clients in a prior-to-answer session state.

At step 3$c$, upon receipt of the communication session setup request, the communication client on communication device 112 will, unless unavailable, alert the user as to the incoming request for communication. Such alert involves activating one or more alert functions on the appropriate device, such as ring and/or vibrate functions.

In addition to alerting the user to the incoming request, the communication client presents the user with an option to establish the incoming communication session directly to hold, for example via the user interface 206 (if the user interface comprises a touch-screen display) or via display 224. The user may also be presented with conventional options to establish or reject the incoming communication session.

At step 3$d$, the user selects the option to establish the incoming communication session directly to hold by entering appropriate user input, for example pressing a "hold" key via the user interface 206 and a communication session hold response message is transmitted from the communication device 112 to communication session control system 106.

Communication session control system 106 receives the response message of step 3$d$ and determines that the communication session is to be established in an on-hold state.

Communication session control system 106 establishes a communication session with the remote device 126 at step 3$e$. As such, an intermediate node, in this case the communication session control system 106 establishes the incoming communication session from the remote device 126 on behalf of the user and applies a communication session hold treatment to the held communication session. In some embodiments, the communication session server element 130 may determine that the communication session is to be established in an on-hold state and may transmit data to the media server element 132 such that the media server 132 may establish the holding connection with the remote device 126.

At step 3*f,* communication session control system 106 transmits notification data to another of the user's communication clients—this time associated with communication device 114—to notify the communication client that the communication session involving the remote device 126 has been established in the on-hold state.

At step 3*g,* the communication client at communication device 114 transmits a response to the communication session control system 106 indicating that it is desired for the communication session that is currently in the on-hold state to be established using the communication client at communication device 114.

At step 3*h,* a communication session is established between the remote device 126 and the communication client at communication device 114. The communication session may be established by setting up a further leg of the communication session between the communication session control system 106 and the communication client at communication device 114.

The communication session control system 106 may then connect together the already established communication session between the remote device 126 and the communication session control system 106 and the newly established communications session leg established between the communication session control system 106 and the communication device 114 such that data (for example voice and/or video data) may be communicated between the remote device 126 and the communication client at communication device 114. The communication session control system 106 may continue to bridge the connection between the remote device 126 and the communication client at communication device 114.

There are various situations in which the communication session-handling feature of establishing an incoming communication session directly to hold and being able to retrieve the held communication session using another communication client may minimise the amount of user interaction required to handle the communication session in a particular manner. The user interaction may be reduced in terms of both the number of button presses and the active user-user interaction (which may for example disrupt a meeting that the user is in) until the user has access to the device on which they wish to retrieve the held communication session.

Establishing an as-yet un-established communication session directly to a hold state may be invoked prior to communication session establishment from any of the user's communication devices 108 that is able to offer an appropriate user interface. In such cases, the communication session is established in an on-hold state and the held communication session can then be retrieved from hold on any twinned device (including the device that invoked the 'establish to hold' request if desired). While a communication session is on hold, some or all of the twinned devices may optionally re-label an appropriate, existing button or may create a new button displaying text such as "retrieve held communication session", an intuitive graphical icon representing such functionality or the like. Further communication session-handling options such as "retrieve held communication session with video only" and "retrieve held communication session with audio only" may be provided on some or all of the twinned devices in order to further reduce the number of user interface operations the user needs to invoke to establish the communication session in a most preferred manner.

As will be described below in more detail, when a communication session is established in an on-hold state, an appropriate message may be communicated to the remote party to inform the remote party that the communication session is in the on-hold state. This may comprise transmitting appropriate media data, such as image, video or audio data to the remote device associated with the remote party. In some embodiments, a fixed, predetermined text message, optionally overlaid on a static picture or pre-recorded video previously provided or selected by the user could be conveyed to the remote party. In some embodiments, multimedia session content, such as the browsing of a gallery of recent photos, may be made available while on hold. Text-to-speech or scrolling text overlaid on a video or picture may be used to allow a user to set the on hold message using a keyboard if no microphone or camera is available.

There are various situations in which a user may wish to establish a communication session directly to the hold state and then be able to retrieve the held call on another of the user's devices. For example, conventionally, a user in a conference room may receive an incoming call, accept the incoming call, quietly inform the caller that they are in the process of exiting the room to be able to talk to the caller, and then the user leaves the room to speak to the caller. This can not only disrupt the conference, but the caller may not be able to hear the user if the user is speaking quietly.

Using the 'establish to hold' feature described above in the same situation, the user may invoke this feature from one of their twinned devices when receiving an incoming call, before the incoming call is accepted and established, without having to speak to the caller, excuse themselves from the meeting, then retrieve the communication session on one of their twinned devices once they are outside the conference room.

Another situation in which the user may wish to use the 'establish to hold' feature is when the user receives an incoming communication session request on a device having certain capabilities and wishes to establish the communication on a different device that has at least one different capability. For example, the user may receive an incoming communication session request on a device that does not have video communication functionality and the user wishes to establish the communication session in video mode. Instead of accepting the incoming communication session request on the non video-capable device and later re-establishing the communication session using the video-capable device (or rejecting the incoming communication session request outright), the user can establish the communication session in an on-hold state and then retrieve the on-hold session from a device with video capabilities. This allows a user to establish an incoming communication session directly to hold, but with an audio only, video only, multi-media or other type of hold message, for example: "Please hold while I move to a convenient location" or "Please hold while I prepare to answer using video".

The 'establish to hold' feature may be beneficial for avoiding possible confusion or embarrassment where Rich Communication Suite (RCS) presence indicates a user as video capable (since at least one of their devices has that feature) but that user currently only has their non-video device to hand.

The option to establish to video hold could be offered as a specific "establish to video hold" treatment option, or could be automatically invoked when the more general "establish to hold" is selected for an incoming communication session which is offering Session Description Protocol (SDP) for video and the originating party is a member of the terminating user's VIP or family group, for example.

In the case of an incoming communication session request, the originating party may thus be informed that the terminating party intends to establish the communication session with video shortly.

Figure 4:
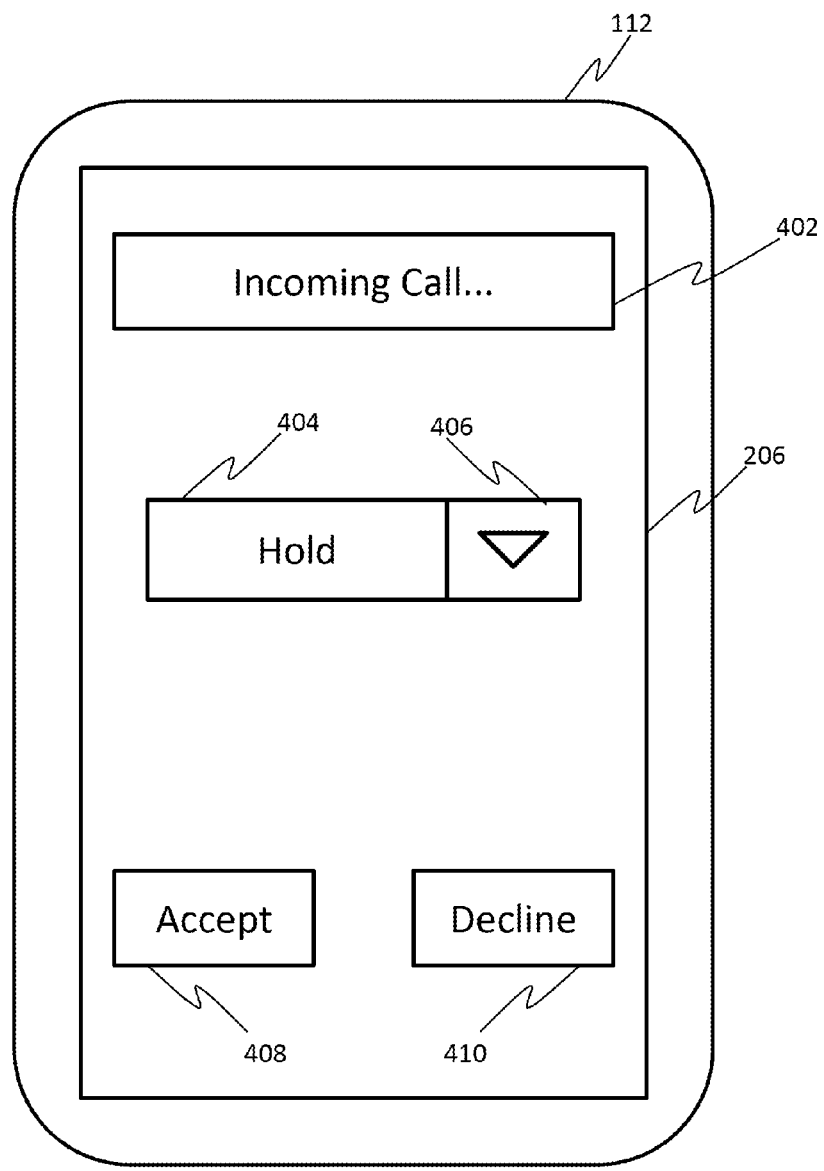
FIG. 4 shows a user interface displaying communication session handling options in accordance with some embodiments.

FIG. 4 shows a user interface displaying communication session handling options in accordance with some embodiments. The user interface 206 is provided on a communication device, in this case a mobile telephone 112, which includes a touch-screen display that outputs data for the user and receives user input from the user.

The user interface 206 includes a communication session status display region 402 which displays the text "Incoming Call . . . " to indicate that a communication session establishment request has been received but that the communication session has not yet been established.

The user interface 206 includes an 'establish to hold' button 404 and an 'establish to hold' menu button 406. Pressing the 'establish to hold' button 404 causes 'establish to hold' call-handling to be invoked. Pressing the 'establish to hold' menu button 406 causes additional options associated with establishing the communication session in an on-hold state to be displayed, as will be described below with reference to FIG. 5.

The user interface 206 also displays "Accept" and "Decline" buttons 408, 410 which serve their conventional purposes.

Thus, the options available to the user for handling establishment of the incoming communication session request are extended to allow the incoming communication session to be placed immediately on hold, without the user having to establish the communication session themselves and communicate with the originating party.

The interface by which a twinned device client instructs the communication session control system 106 to invoke a selected action can be SIP, web services, a combination of both, or other similar protocols. The protocols used need not be the same on all devices.

Figure 5:
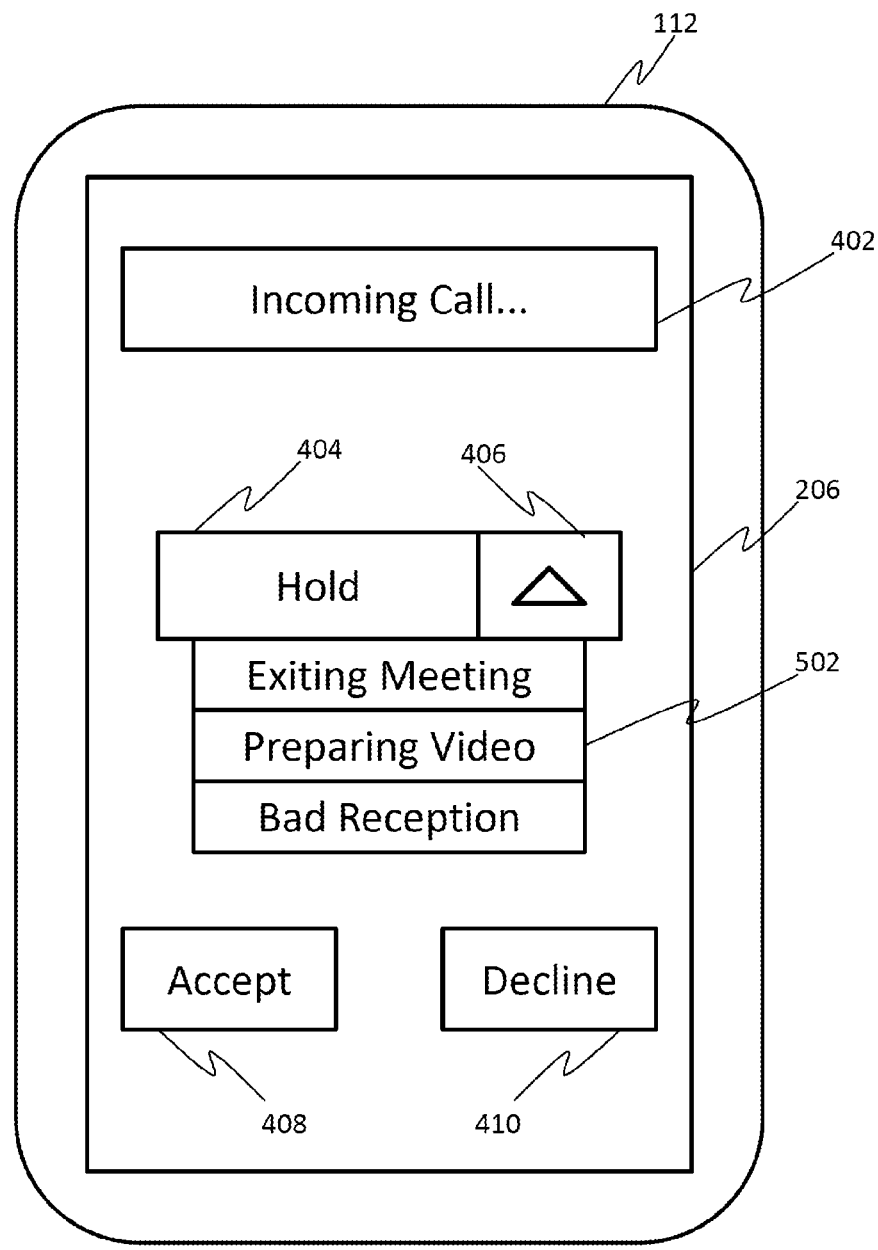
FIG. 5 shows a user interface displaying communication session handling options in accordance with some embodiments.

FIG. 5 shows a user interface displaying communication session handling options in accordance with some embodiments. FIG. 5 is similar to FIG. 4 but shows the addition of a hold treatment option menu 502, which is accessed by pressing the 'establish to hold' option selection button 404 and is a drop-down menu of different possible hold treatments, from which a specific hold treatment for the communication session may be selected. The user interface 206 is provided on a communication device, in this case a mobile telephone 112, which includes a touch-screen display which outputs data for the user and receives user input from the user.

The hold treatment option menu 502 identifies three hold treatment options.

One of the hold treatment options is labelled "Exiting Meeting". Selecting this option causes the incoming communication session to be established in an on-hold state and the originating party informed that the terminating party is in the process of exiting a meeting to fully establish the communication session.

Another of the hold treatment options is labelled "Preparing Video". Selecting this option causes the incoming communication session to be established in an on-hold state and the originating party informed that the terminating party will establish the communication session in video mode shortly.

The final hold treatment option is labelled "Bad Reception". Selecting this option causes the incoming communication session to be established in an on-hold state and the originating party informed that the terminating party is in the process of seeking to improve reception prior to establishing the communication session.

A different number of hold treatment options and/or different types of hold treatment option may be identified. Some of the hold treatment options may have been set up by the user, for example by recording a particular message to be played to a remote party if that option is selected and a relevant name having been assigned to that hold treatment option.

In some embodiments, if the 'establish to hold' button 404 is selected (for example by touching the corresponding touch-sensitive screen region), a default hold treatment associated with remote party is invoked. In some embodiments, the user may be able to select a specific type of hold treatment to be applied by selecting an appropriate hold treatment option from the hold treatment option menu 502.

This flexibility gives the user more granular control of the message to be played to the remote party while the communication session is on hold, and may include options enabling the user to specify whether the message should be audio-only, video-only, multi-media or another type of message. The user interface 206 for invoking this the 'establish to hold' feature or service may therefore allow the user to select whether to offer multimedia on hold, which may for example indicate the intent of the user to establish the communication session shortly in video, or audio only mode. The user interface 206 may optionally allow selection of the media to play, either on a per-communication session basis or as pre-configured options for example based on the identity of the remote party and the like. In some embodiments, the on-hold communication session is a one-way on-hold communication session in which media data is communicated to the remote device 126 but in which the remote device 126 does not communicate media data to the communication session control system 106.

Thus, one hold treatment option uses as a video hold message, for example, a blank image, a pre-recorded message, or a stored static image streamed from the media server element 132 or from elsewhere in the network 100, for example from one or more of the communication devices 108. The video hold message may optionally be selected automatically based on a remote party identifier to allow personalised messages for particular remote party. Alternatively or additionally, the user interface options for invoking the video hold message function may provide a list of possible video hold options so that the user can manually select the video hold message. If there is an active audio media path and the video hold message is invoked, in other words if an established communication session is placed on video hold, the active audio media path may continue to be communicated or may be muted or replaced by an audio hold message. If there is no current audio path or video path (for example, when a communication session is established straight to hold), one or both of an audio and video hold message may be created. In some embodiments, the communication session may be held using audio only. A multi-media hold message is similar to a video hold message, but a pre-recorded audio hold message is transmitted, in addition to the video. The audio message may optionally be from a pre-recorded selection, silent or a tone pattern. In the case of a new incoming communication session established directly to hold, the choice of whether to offer SDP for audio and/or video while on hold may be automatically determined from the SDP offered from the originating party, pre-configured, or optionally offered as a specific choice in the user interface invoking this feature.

Figure 6:
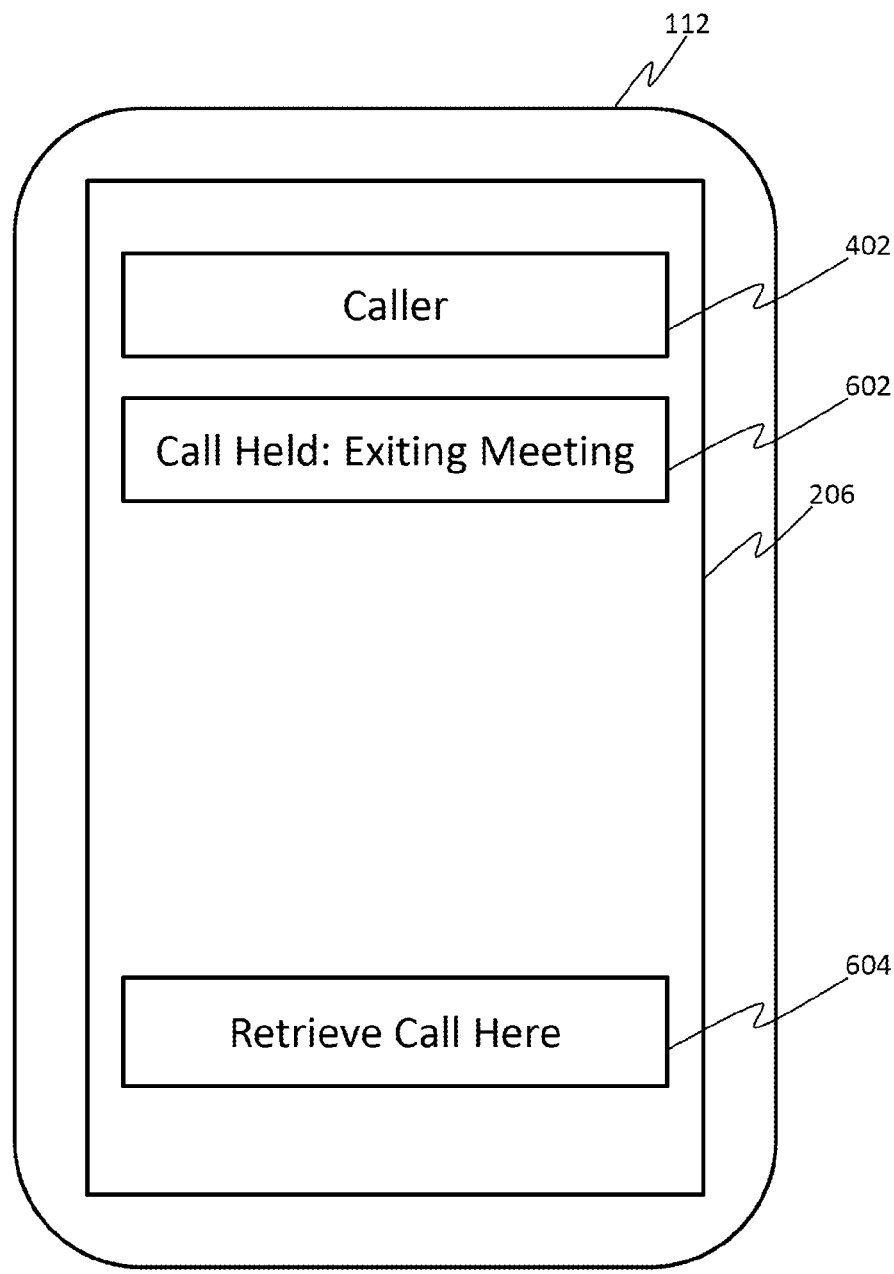
FIG. 6 is a schematic representation of a telephony device having a user interface displaying an option to retrieve a held communication session in accordance with some embodiments.

FIG. 6 is a schematic representation of a telephony device having a user interface displaying an option to retrieve a held communication session in accordance with some embodiments. The user interface 206 is provided on one of the user's twinned communication devices, in this case another mobile telephone 112, which includes a touch-screen display which outputs data for the user and receives user input from the user. This communication device has received notification data indicating that a call has been established to hold and may be retrieved on this communication device.

The user interface 206 includes a communication session status display region 402 which displays the text "Caller" which identifies the remote party or other information associated with the communication session that has been established to hold.

The user interface 206 also includes a hold treatment display region 602 which displays the text "Caller" which identifies particular hold treatment that has been applied in relation to the communication session that has been established to hold, in this case the "Exiting Meeting" option.

The user interface 206 further includes a held call retrieval button 604 which displays the text "Retrieve Call Here". By selecting the held call retrieval button 604, the user can retrieve the communication session that has been established to hold. Thus, the user device provides the option, during a prior-to-answer session state in relation to another of the communication clients, to establish the communication session with the remote device.

Retrieving the held communication session may be performed on any of the user's twinned devices.

Although, as explained above with reference to FIG. 4, the 'establish to hold' button 404 is separate from the "Accept" and "Reject" buttons 408, 410 that are commonly already in existence on user interfaces, the held call retrieval button 604 may be combined with or may replace an existing button or action with which the user is already familiar, such as a "pull communication session to this device" where an in-progress communication session may be pulled to one twinned device from another twinned device. Thus, the same button (at least from the user's perspective) that would be used to retrieve an ongoing, established communication session from a twinned device could also be used to retrieve a communication that has been established to hold by a twinned device.

Figure 7:
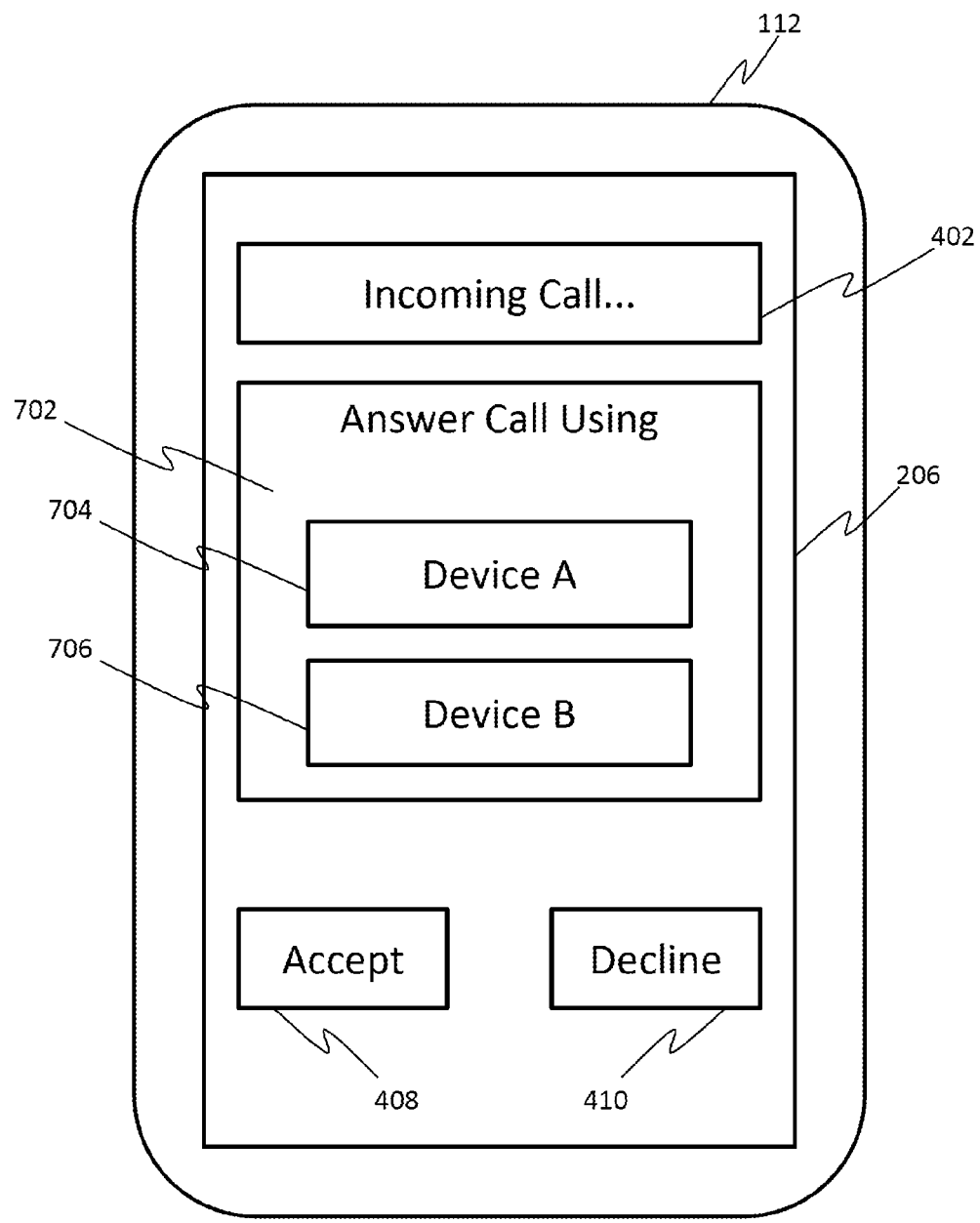
FIG. 7 is a schematic representation of a telephony device having a user interface displaying incoming communication session handling options.

FIG. 7 is a schematic representation of a telephony device having a user interface displaying incoming communication session handling options. The user interface 206 is provided on a communication device, in this case a mobile telephone 112, which includes a touch-screen display which outputs data for the user and receives user input from the user.

The user interface 206 includes a communication session establishment option display region 702 which displays the text "Answer Call Using" and includes a button 704 displaying the text "Device A" and another button 706 displaying the text "Device B".

The user may receive an incoming communication session setup request and may decide that it would be preferred to establish the communication session using a different, twinned device. The communication session establishment option display region 702 provides the user with an option to enable the communication session to be established using one or, possibly, both of device A and device B where device A and device B are twinned devices.

Selecting button 704 or 706 may cause the incoming communication session to be established to hold and the device corresponding to the selected button notified that a communication session that has been established to hold is available for retrieval (for example as depicted in FIG. 6).

Alternatively, selecting button 704 or 706 may cause the communication session control system 106 to transmit a communication session setup request to the device corresponding to the selected button to inform the device corresponding to the selected button that the communication session is available for retrieval at the device corresponding to the selected button and enable the communication session to be established using the device corresponding to the selected button before determining that the communication session is to be established on hold. This may be preferable where the user wishes to establish the communication session without initially placing the communication session on hold but wishes to do so using a different, twinned device.

Although two buttons 704 and 706 have been depicted in FIG. 7 and described above, it will be appreciated that the option to establish the communication session using only a single twinned device may be provided, for example for policy reasons, if the user has only one twinned device, or for other reasons.

As depicted in FIG. 7, the telephony device displays status information relating to an incoming communication session. In this case, the status is that the communication session is incoming, but had not yet been established.

In addition to options for accepting or declining the incoming communication session being displayed to the user, various additional options for handling the incoming communication session are also displayed. These options include establishing the communication session using another of the user's telephony devices. In some embodiments, an option may be provided to establish the communication session straight to hold using one of the user's other telephony devices. Selection of such options by the user may cause the telephony device to transmit data identifying the selected other telephony device to the communication session control system 106, based on which the communication session control system 106 can take an appropriate action for handling the communication session. This may comprise transmitting a communication session setup request to the other telephony device associated with the user, may comprise establishing the communication session to hold in the network and transmitting notification data to the identified other telephony device or may comprise other actions.

Figure 8:
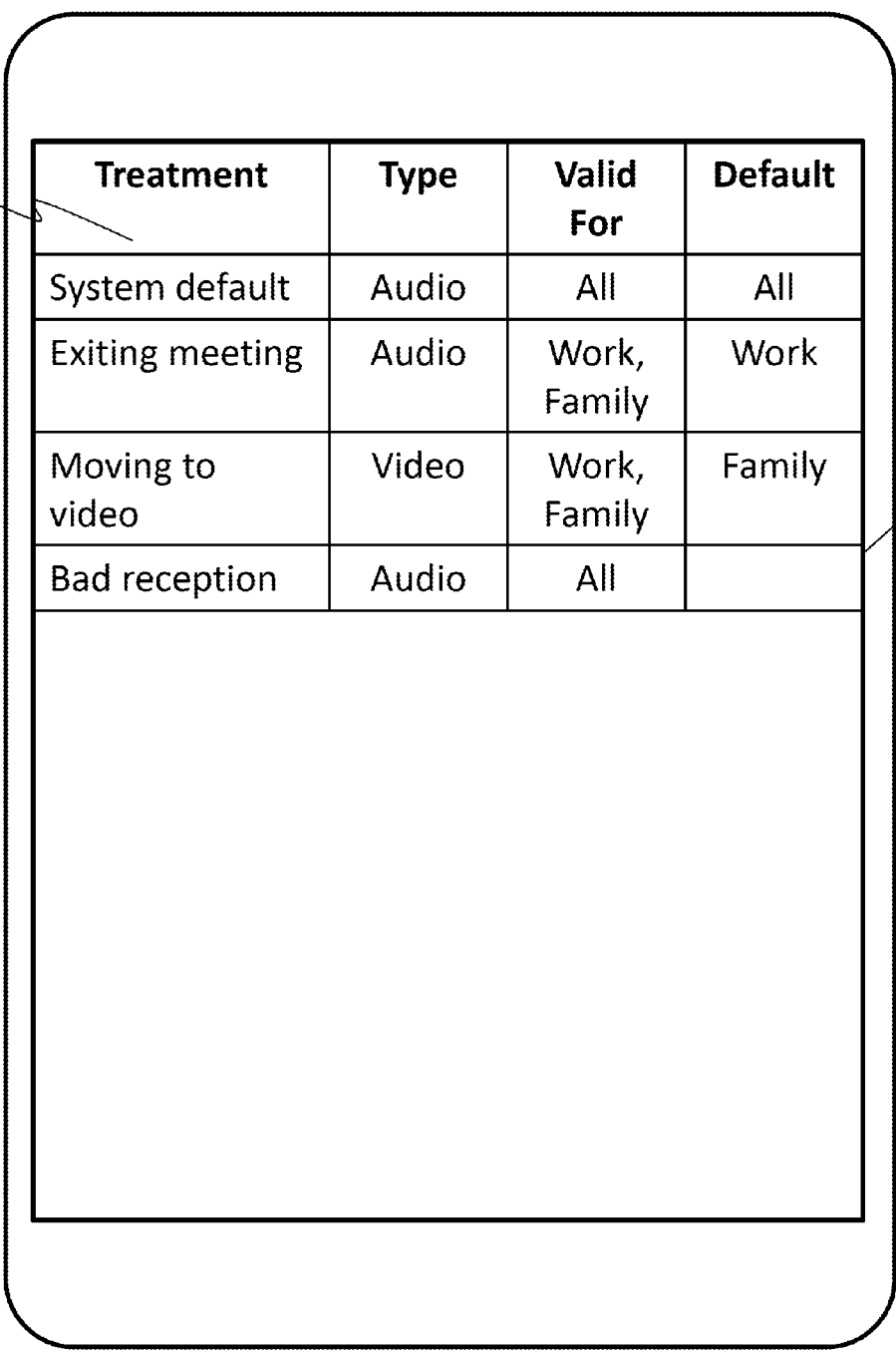
FIG. 8 shows a user device having a user interface displaying hold treatment management options in accordance with some embodiments.

FIG. 8 shows a user device having a user interface displaying hold treatment management options in accordance with some embodiments. The user interface is provided on a communication device, in this case a tablet computing device 114, which includes a touch-screen display 206 which outputs data for the user and receives user input from the user.

As depicted in FIG. 8, the user may also be offered control of the repertoire of hold treatments available and configuration of the default message type for different groups of remote party via a menu 802.

The default communication session hold treatment for a specific incoming communication session may be determined from any information available to the communication client or communication session control system 106 at the time of the communication session including, for example, the identity of the remote party, contacts group membership (for example whether the remote party belongs to a "Family", "Friends", "Work" group and the like), current user presence or calendar state, communication session type (voice, video, or other types of communication session) and a system-wide default when no match is found to some or all selection criteria. These functions may be integrated with network-based address book and/or social network contacts as opposed to being based on on-device contacts.

The time of day or day of week in the user's home or current local time zone may be used to determine how to handle an incoming communication session for the user.

The user may be allowed to record and manage outbound messages to be played for a specified time period only. For example, the user may record a message indicating that they are currently driving which is to be played while they are driving. This may automatically invoke the hold treatment so that the user does not need to interact with their mobile phone while driving, so that the user can find a safe place to stop and retrieve the call, for example if required by local legislation. The user may still receive an indication on the mobile client that the communication session was in progress.

With reference to FIG. 8, the default hold treatment for an incoming communication session from a Work contact (for example, a from a remote party recognised to be "The Office") would be to play the "Exiting meeting" communication session treatment, which is a recorded audio message, for example "I am just exiting a meeting in order to be able to talk to you. Please hold and I will be available shortly".

A method for establishing a communication session with a user in a telecommunications network is provided. The communication session is to be established between a remote device associated with a remote party and one of a plurality of communication clients. Each of the communication client is on a user device at which the user may participate in the communication session. The method comprises, at a communication session control system located in a signalling path for the communication session: transmitting a communication session establishment request to a given communication client to place the given communication client in a prior-to-answer session state; receiving, in response to transmitting the communication session establishment request, a request from the given communication client that the option to establish the communication session with the remote device be made available to at least one communication client of the plurality of communication clients other than the given communication client; and transmitting notification data to the at least one other communication client in the plurality of communication clients to notify the at least one other communication client that the communication session is available for retrieval by the at least one other communication client.

In some embodiments, data identifying the at least one other communication client is received from the given communication client.

In some embodiments, it is determined that the communication session is to be established initially in an on-hold state; and communication session setup data is transmitted to allow an on-hold communication session to be established between the remote device and an intermediate node in the telecommunications network.

In some embodiments, media data is communicated via the on-hold communication session established between the remote device and the intermediate node to notify the remote party that the communication session has been established in an on-hold state.

In some embodiments, at least some of the media data is selected from a set comprising a plurality of media data items.

In some embodiments, data that identifies the media data is received from the given communication client.

In some embodiments, the media data is selected on the basis of one or more predetermined media data selection rules.

In some embodiments, the media data comprises video data.

In some embodiments, the notification data is displayable on a graphical user interface.

In some embodiments, a communication session setup request is transmitted to the at least one other communication client.

In some embodiments, a communication session setup response is received from the at least one other communication client; and a communication session is caused to be established between the remote device and the at least one other communication client.

In some embodiments, each communication client is on a different user device at which the user may participate in the communication session.

A computer program product comprising a non-transitory computer-readable storage medium having computer readable instructions stored thereon is also provided. The computer readable instructions are executable by a computerized device to cause the computerized device to perform a method for establishing a communication session with a user in a telecommunications network. The communication session is to be established between a remote device associated with a remote party and one of a plurality of communication clients. Each of the communication clients is on a user device at which the user may participate in the communication session. The method comprises, at a communication session control system located in a signalling path for the communication session: transmitting a communication session establishment request to a given communication client to place the given communication client in a prior-to-answer session state; receiving, in response to transmitting the communication session establishment request, a request from the given communication client that the option to establish the communication session be made available to at least one communication client of the plurality of communication clients other than the given communication client; and transmitting notification data to the at least one other communication client in the plurality of communication clients to notify the at least one other communication client that the communication session is available for retrieval by the at least one other communication client.

An apparatus for establishing a communication session with a user in a telecommunications network is also provided. The communication session is to be established between a remote device associated with a remote party and one of a plurality of communication clients. Each of the communication clients is on a user device at which the user may participate in the communication session. The apparatus is locatable in a signalling path for the communication session and comprises: one or more transmitters operable to transmit a communication session establishment request to a given communication client to place the given communication client in a prior-to-answer session state; one or more receivers operable to receive, in response to transmitting the communication session establishment request, a request from the given communication client that the option to establish the communication session be made available to at least one communication client of the plurality of communication clients other than the given communication client; and one or more transmitters operable to transmit notification data to the at least one other communication client in the plurality of communication clients to notify the at least one other communication client that the communication session is available for retrieval by the at least one other communication client.

A user device for establishing a communication session with a user in a telecommunications network is also provided. The communication session is to be established between a remote device associated with a remote party and one of a plurality of communication clients. Each of the communication clients is on a user device at which the user may participate in the communication session. The user device comprises: one or more receivers operable to receive a communication session establishment request; one or more processors arranged to enter the user device into a prior-to-answer session state in response to receiving the communication session establishment request; a user interface via which a user of the user device is informable of an option for the communication session to be established using at least one other of said communication clients; the or another user interface via which user input relating to the establishment of the communication session is receivable; and one or more transmitters arranged to transmit, in response to receiving predetermined user input during the prior-to-answer session state, a request that the option to establish the communication session with the remote device be made available to at least one other communication client in the plurality of communication clients.

A computer program product comprising a non-transitory computer-readable storage medium having computer readable instructions stored thereon is also provided. The computer readable instructions are executable by a computerized device to cause the computerized device to perform a method for establishing a communication session with a user in a telecommunications network. The communication session is to be established between a remote device associated with a remote party and one of a plurality of communication clients. Each of the communication clients is on a user device at which the user may participate in the communication session. The method comprises, at a given one of the user devices: receiving a communication session establishment request; entering a prior-to-answer session state in response to receiving the communication session establishment request; informing the user of the user device via a user interface of an option for the communication session to be established using at least one other of said communication clients; receiving, via the or another user interface, predetermined user input; and transmitting, during the prior-to-answer session state, a request that the option to establish the communication session with the remote device be made available to at least one other communication client in the plurality of communication clients.

A method for establishing a communication session with a user in a telecommunications network is also provided. The communication session is to be established between a remote device associated with a remote party and one of a plurality of communication clients. Each of the communication clients is on a user device at which the user may participate in the communication session. The method comprises, at a given one of said user devices: receiving a communication session establishment request; entering a prior-to-answer session state in response to receiving the communication session establishment request; informing the user of the user device via a user interface of an option for the communication session to be established using at least one other of said communication clients; receiving, via the or another user interface, predetermined user input; and transmitting, during the prior-to-answer session state, a request that the option to establish the communication session with the remote device be made available to at least one other communication client in the plurality of communication clients.

In some embodiments, each of the communication clients is on a different user device at which the user may participate in the communication session, and the method comprises: informing the user of the user device via a user interface of an option for the communication session to be established on at least one other of said user devices; and transmitting, during the prior-to-answer session state, a request that the option to establish the communication session with the remote device be made available to a communication client on at least one of said user devices different from the given user device.

A user device for establishing a communication session with a user in a telecommunications network is also provided. The communication session is to be established between a remote device associated with a remote party and one of a plurality of communication clients. Each of the communication clients is on a user device at which the user may participate in the communication session. The user device comprises: one or more receivers operable to receive notification data indicating that a communication session is available for retrieval, a communication session establishment request for the communication session having been transmitted to a different communication client in the plurality of communication clients and the different communication client having transmitted, during a prior-to-answer session state, a request that the option to establish the communication session with the remote device be made available to at least one other communication client in the plurality of communication clients; a user interface via which a user of the user device is informable that the communication session is available for retrieval; the or another user interface via which user input relating to the establishment of the communication session is receivable; and one or more transmitters arranged to transmit a communication session retrieval request to request that the communication session be established in response to receiving predetermined user input.

A computer program product comprising a non-transitory computer-readable storage medium having computer readable instructions stored thereon is also provided. The computer readable instructions are executable by a computerized device to cause the computerized device to perform a method for establishing a communication session with a user in a telecommunications network. The communication session is to be established between a remote device associated with a remote party and one of a plurality of communication clients. Each of the communication clients is on a user device at which the user may participate in the communication session. The method comprises, at a given one of the user devices: receiving notification data indicating that a communication session is available for retrieval, a communication session establishment request for the communication session having been transmitted to a different communication client in the plurality of communication clients and the different communication client having transmitted, during a prior-to-answer session state, a request that the option to establish the communication session with the remote device be made available to at least one other communication client in the plurality of communication clients; informing a user of the user device via a user interface that the communication session is available for retrieval; receiving, via the or another user interface, predetermined user input; and transmitting a communication session retrieval request to request that the communication session be established.

A method for establishing a communication session with a user in a telecommunications network is also provided. The communication session is to be established between a remote device associated with a remote party and one of a plurality of communication clients. Each of the communication clients is on a user device at which the user may participate in the communication session. The method comprises, at a given one of the user devices: receiving notification data indicating that a communication session is available for retrieval, a communication session establishment request for the communication session having been transmitted to a different communication client in the plurality of communication clients and the different communication client having transmitted, during a prior-to-answer session state, a request that the option to establish the communication session with the remote device be made available to at least one other communication client in the plurality of communication clients; informing a user of the user device via a user interface that the communication session is available for retrieval; receiving, via the or another user interface, predetermined user input;

and transmitting a communication session retrieval request to request that the communication session be established.

In some embodiments, each of the communication clients is on a different user device at which the user may participate in the communication session, and the method comprises, at a given one of said user devices: receiving notification data indicating that a communication session is available for retrieval, a communication session establishment request for the communication session having been transmitted to a different communication client in the plurality of communication clients and the different communication client having transmitted, during a prior-to-answer session state, a request that the option to establish the communication session with the remote device be made available to a communication client on at least one of said user devices different from the given user device.

The above embodiments are to be understood as illustrative examples. Further embodiments are envisaged.

Although embodiments have been described above in which a communication session that has not yet been established can be established in an on-hold state, an option may be provided to the user during an established communication session to place the established communication session on hold.

Furthermore, although embodiments have been described in which a communication session is established to hold and an appropriate message is communicated to an originating party, other embodiments are envisaged. For example, rather than establishing to hold, a first ringback tone could be communicated to the originating party while an attempt is made to establish the communication session with a first communication client associated with the user and, if the first communication session is not established with the first communication client, a second, different ringback tone could be communicated to the originating party while an attempt is made to establish the communication session with the second communication client.

Web Real-Time Communication (WebRTC) or similar future protocols may be used for client interaction.

Embodiments have been described above in which two communication clients are associated (or twinned) with a given telephony ID. However, it will be appreciated that more than two communication clients may be associated (or twinned) with a given telephone ID.

In some embodiments described above, the remote party device 126 is capable of conducting communications via the circuit-switched network 102. Additionally or alternatively, the remote party device 126 may be capable of conducting communications device the packet-switched network 104, for example to facilitate the use of video calls.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for establishing a communication session between a user in a telecommunications network and a remote party, the method comprising:
   transmitting, at a communication session control system located in a signaling path for the communication session, a communication session establishment request, wherein the communication session establishment request includes a request to a given communication client, of a plurality of communication clients, to place the given communication client in a prior-to-answer session state, wherein the given communication client is on one of one or more user devices at which the user may accept the communication session establishment request and conduct voice communications with the remote party, and wherein the remote party is associated with a remote device;
   receiving, in response to transmitting the communication session establishment request, a communication session hold response message from the given communication client, the communication session hold response message requesting that a communication session with the remote device be established initially in an on-hold state and that an option to retrieve the on-hold communication session be made available to at least one communication client of the plurality of communication clients other than the given communication client, wherein the at least one other communication client is on one of the one or more user devices at which the user may participate in the communication session;
   determining, based on said communication session hold response message received from the given communication client, that the option to retrieve the on-hold communication session is to be made available to the at least one other communication clients; and
   transmitting notification data to the at least one other communication client to notify the at least one other communication client that the on-hold communication session is available for retrieval by the at least one other communication client.

2. The method of claim 1, further comprising:
   receiving data identifying the at least one other communication client from the given communication client.

3. The method of claim 1, further comprising:
   determining that the communication session is to be established initially in the on-hold state; and
   transmitting communication session setup data to allow the on-hold communication session to be established between the remote device and an intermediate node in the telecommunications network.

4. The method of claim 1, wherein the intermediate node is the communication session control system.

5. The method of claim 3, wherein media data is communicated via the on-hold communication session established between the remote device and the intermediate node to notify the remote party that the communication session has been established in the on-hold state.

6. The method of claim 5, wherein at least some of the media data is selected from a set comprising a plurality of media data items.

7. The method of claim 5, wherein data that identifies the media data is received from the given communication client.

8. The method of claim 5, wherein the media data is selected on the basis of one or more predetermined media data selection rules.

9. The method of claim 5, wherein the media data comprises video data.

10. The method of claim 1, wherein the notification data is displayable on a graphical user interface.

11. The method of claim 1, further comprising:
    transmitting a communication session setup request to the at least one other communication client.

12. The method of claim 11, further comprising:
    receiving a communication session setup response from the at least one other communication client; and
    causing a communication session to be established between the remote device and the at least one other communication client.

13. The method of claim 1, wherein the given communication client and the least one other communication client are on different ones of the one or more user devices.

14. The method of claim 1, wherein the given communication client and the at least one other communication client are co-located on one of the one or more user devices.

15. The method of claim 1, wherein the notification data is configured to notify the at least one other communication client that the communication session is available for retrieval from the on-hold state.

16. The method of claim 15, further comprising:
establishing a communication session with the at least one other communication client; and
connecting the communication session established with the remote device with the communication session established with the at least one other communication client.

17. The method of claim 1, wherein the plurality of communication clients are associated with a client-shared telephony identifier.

18. The method of claim 1, further comprising:
determining that the communication session is to be established initially in the on-hold state;
establishing a communication session with the remote device; and
applying a communication session hold treatment to the communication session.

19. A system for establishing a communication session between a user in a telecommunications network and a remote party, the system comprising:
one or more transmitters being locatable in a signaling path for the communication session and operable to transmit a communication session establishment request to a given communication client, of a plurality of communication clients, to place the given communication client in a prior-to-answer session state, wherein the given communication client is on one of one or more user devices at which the user may accept the communication session establishment request and conduct voice communications with the remote party, and wherein the remote party is associated with a remote device; and
one or more receivers operable to receive, in response to transmitting the communication session establishment request, a communication session hold response message from the given communication client, the communication session hold response message requesting that the communication session with the remote device be established initially in an on-hold state and that an option to retrieve the on-hold communication session be made available to at least one communication client of the plurality of communication clients other than the given communication client, wherein the at least one other communication client is on one of the one or more user devices at which the user may participate in the communication session,
wherein the system is configured to determine, based on said communication session hold response message received from the given communication client, that the option to retrieve the on-hold communication session is to be made available to the at least one other communication client, and wherein said system further comprises:
one or more transmitters operable to transmit notification data to the at least one other communication client to notify the at least one other communication client that the on-hold communication session is available for retrieval by the at least one other communication client.

20. A non-transitory computer-readable storage medium comprising computer-executable instructions which, when executed by a processor, cause a computerized device to perform a method for establishing a communication session between a user in a telecommunications network and a remote party, the method comprising:
transmitting, at a communication session control system located in a signaling path for the communication session, a communication session establishment request, wherein the communication session establishment request includes a request to a given communication client, of a plurality of communication clients, to place the given communication client in a prior-to-answer session state, the given communication client is on one of one or more user devices at which the user may accept the communication session establishment request and conduct voice communications with the remote party, wherein the remote party is associated with a remote device;
receiving, in response to transmitting the communication session establishment request, a communication session hold response message from the given communication client, the communication session hold response message requesting that the communication session with the remote device be established initially in an on-hold state and that an option to retrieve the on-hold communication session be made available to at least one communication client of the plurality of communication clients other than the given communication client, wherein the at least one other communication client is on one of the one or more user devices at which the user may participate in the communication session;
determining, based on said communication session hold response message received from the given communication client, that the option to retrieve the on-hold communication session is to be made available to the at least one other communication client; and
transmitting notification data to the at least one other communication client to notify the at least one other communication client that the on-hold communication session is available for retrieval by the at least one other communication client.

* * * * *